(12) United States Patent
Ishii

(10) Patent No.: US 11,580,383 B2
(45) Date of Patent: Feb. 14, 2023

(54) NEURAL NETWORK LEARNING DEVICE, METHOD, AND PROGRAM

(71) Applicant: NEC Corporation, Tokyo (JP)

(72) Inventor: Masato Ishii, Tokyo (JP)

(73) Assignee: NEC CORPORATION, Tokyo (JP)

(*) Notice: Subject to any disclaimer, the term of this patent is extended or adjusted under 35 U.S.C. 154(b) by 810 days.

(21) Appl. No.: 16/481,536

(22) PCT Filed: Mar. 16, 2017

(86) PCT No.: PCT/JP2017/010560
§ 371 (c)(1),
(2) Date: Jul. 29, 2019

(87) PCT Pub. No.: WO2018/167900
PCT Pub. Date: Sep. 20, 2018

(65) Prior Publication Data
US 2020/0193285 A1  Jun. 18, 2020

(51) Int. Cl.
*G06N 3/08* (2006.01)
*G06N 20/00* (2019.01)
*G06K 9/62* (2022.01)

(52) U.S. Cl.
CPC ............ *G06N 3/08* (2013.01); *G06K 9/6234* (2013.01); *G06K 9/6268* (2013.01); *G06N 20/00* (2019.01)

(58) Field of Classification Search
CPC .... G06K 9/6273; G06K 9/6256; G06N 20/00; G06N 3/08; G10L 15/06; G10L 15/065
USPC .............................. 706/6, 12, 15, 16, 25, 41
See application file for complete search history.

(56) References Cited

U.S. PATENT DOCUMENTS

2017/0039471 A1  2/2017  Ogawa

FOREIGN PATENT DOCUMENTS

| JP | 2009-032273 A | 2/2009 | |
| JP | 2011-008634 A | 1/2011 | |
| JP | 2014-178229 A | 9/2014 | |
| JP | 2014178229 | * 9/2014 | ........... G01N 21/956 |
| JP | 2016-099507 A | 5/2016 | |
| JP | 2016099507 | * 5/2016 | ............ G10L 15/06 |
| JP | 2017-037392 A | 2/2017 | |

OTHER PUBLICATIONS

International Search Report for PCT Application No. PCT/JP2017/010560, dated Jun. 20, 2017.
English translation of Written opinion for PCT Application No. PCT/JP2017/010560.

* cited by examiner

*Primary Examiner* — Yosef K Laekemariam
(74) *Attorney, Agent, or Firm* — Sughrue Mion, PLLC

(57) ABSTRACT

A large amount of training data is typically required to perform deep network leaning, making it difficult to achieve using a few pieces of data. In order to solve this problem, the neural network device according to the present invention is provided with: a feature extraction unit which extracts features from training data using a learning neural network; an adversarial feature generation unit which generates an adversarial feature from the extracted features using the learning neural network; a pattern recognition unit which calculates a neural network recognition result using the training data and the adversarial feature; and a network learning unit which performs neural network learning so that the recognition result approaches a desired output.

7 Claims, 5 Drawing Sheets

NEURAL NETWORK LEARNING DEVICE, METHOD, AND PROGRAM

This application is a National Stage Entry of PCT/JP2017/010560 filed on Mar. 16, 2017, the contents of all of which are incorporated herein by reference, in their entirety.

TECHNICAL FIELD

This invention relates to a neural network learning device, method, and program.

BACKGROUND ART

Pattern recognition techniques are techniques for estimating which class an input pattern belongs to. Specific examples of pattern recognition include object recognition for estimating a taken object in response to an image as an input, speech recognition for estimating utterance contents in response to speech as an input, and so on.

Statistical machine leanings are widely used as the pattern recognition techniques. It is known that, among the statistical machine leanings, in particular, a neural network can carry out robust recognition against variations of an input pattern because learning of a deep network becomes possible due to recent development of a learning technique called deep learning.

As is well known, machine leanings are broadly classified into two types: supervised learning and unsupervised learning. In the supervised learning, a machine is caused to automatically analyze data with a correct solution (may also be called training data or teaching data) and to classify a calculated feature into the correct solution, thereby learning a relationship between the correct solution and the feature. In other words, in the supervised learning, the training data comprising a set of an "input" and a "correct output (classifying)" are preliminarily prepared and learned by a computer (the machine) so that the correct output (classifying) is possible when any input is given. In comparison with this, in the unsupervised learning, learning is carried out using input data (training data) only and an essential structure is learned from features extracted from the training data. In other words, the unsupervised learning is used to find, when given input data (training data) only, a structure inherent in the data.

The machine learning is divided into two phases: a "learning phase" for creating a neural network and a "recognizing phase" or a "prediction phase" for providing a correct solution using the neural network which has been created. While known machine learnings require feature engineering by human beings, the deep learning automatically acquires (captures) features from the training data to carry out learning.

Various prior art documents related to the present invention are known.

Patent Literature 1 discloses a "neural network learning device" which is capable of optimizing a structure of a neural network. The neural network learning device disclosed in Patent Literature 1 comprises an initial structure acquisition unit and an arithmetic unit. The arithmetic unit comprises a database, a learning unit, and an intermediate layer generation unit. The database preliminarily memorizes and stores a plurality of pieces of training data (which are also called learning samples). The learning unit comprises a training data reading unit, a connection weight correction unit, a neuron generation unit, and a neuron annihilation unit. The intermediate layer generation unit carries out intermediate layer generation processing. For example, the intermediate layer generation processing newly generates, between an intermediate layer closest to an output layer and the output layer in the neural network, an additional intermediate layer as another intermediate layer.

The arithmetic unit comprises a neural network of an initial structure which is acquired by the initial structure acquisition unit. The neuron generation unit generates a new neuron in the intermediate layer as a generation-target intermediate layer.

Patent Literature 2 discloses a "teaching data preparing method" which is capable of effectively carrying out learning even if it is impossible to prepare a sufficient number of teaching images for all of a plurality of classification categories. The teaching data preparing method disclosed in Patent Literature 2 includes a teaching step, a primary preparing step, and a secondary preparing step. The teaching step associates each of the plurality of teaching images with one of the plurality of classification categories into which the teaching image in question should be classified. The primary preparing step obtains, for at least one of the plurality of classification categories as a target category, a set of values of a plurality of kinds of features calculated on the teaching image associated with the target category and uses the set of values as teaching data associated with the target category. The secondary preparing step generates, on the basis of one piece of the teaching data, new values of the features corresponding to a point at which a distance from a point occupied by the teaching data is within a predetermined distance in a feature space comprising the plurality of kinds of features, and associates these values of the features with the target category to produce new teaching data.

In Patent Literature 2, a method of using apexes of a hypercube having a point corresponding to the teaching data as a body center can generate the new teaching data only by adding a predetermined value to a value of at least one of the various kinds of features representing the teaching data. If supplementation of teaching data is carried out for the classification category having a less number of teaching images as the target category, it is possible to effectively avoid disadvantageous overfitting caused by imbalance of the number of the teaching data. Pre-training processing is configured so that relearning can be carried out by supplementing the teaching data as necessary. In addition, the supplementation of the teaching data is carried out by deriving a point corresponding to the new teaching data prepared by the supplementation in the vicinity of a point occupied by already existing teaching data in the feature space. That is, an image imitating a defect image is never generated as a real image. Accordingly, it is possible to limit a distance from the existing teaching data to the new teaching data in the feature space.

Furthermore, Patent Literature 2 discloses a defect classification device (an image classification device) including a feature calculation unit and a defect classification unit. The feature calculation unit calculates a plurality of values of features characterizing the defect image. The defect classification unit classifies, on the basis of the calculated values of the features, the defect image in question into any of the plurality of classification categories using a classifier configured by the pre-training. The defect classification unit executes, in software, processing for classifying the detected defect using a learning algorithm such as a SVM (Support Vector Machine), a neural network, a decision tree, a discrimination analysis, or the like.

Patent Literature 3 discloses a "dictionary generation device for pattern recognition" which is capable of keeping accuracy in processing of the pattern recognition and of speeding up the processing. The dictionary generation device for pattern recognition disclosed in Patent Literature 3 comprises a processor and a storage medium connected to the processor. The storage medium stores a learning pattern database comprising a plurality of learning patterns therein. The dictionary generation device for pattern recognition comprises a pattern input unit, a feature extraction unit for extracting an n-dimensional feature, a feature selection dictionary generation unit, a feature selection unit, a discrimination function generation unit, and a discrimination function major part extraction unit.

In the dictionary generation device for pattern recognition, the feature selection dictionary generation unit generates a feature selection function for converting the n-dimensional feature into an m-dimensional feature and stores the feature selection function as a feature selection dictionary in the storage medium. The feature selection unit converts the extracted n-dimensional feature into the m-dimensional feature using the feature selection function. The discrimination function generation unit generates a detail discrimination function for calculating a similarity of a pattern and stores the detail discrimination function as a discrimination dictionary in the storage medium. The discrimination function major part extraction unit at first generates a major classification feature selection function for converting the m-dimensional feature into an L-dimensional feature on an L-dimensional feature space which is a subspace of the n-dimensional feature space and a subspace of the m-dimensional feature space. Subsequently, the discrimination function major part extraction unit generates a major classification discrimination function for calculating the similarity of the pattern as a recognition target for each category on the L-dimensional feature space by converting the detail discrimination function into a function on the L-dimensional feature space. Then, the discrimination function major part extraction unit stores the major classification feature selection function as a feature selection dictionary in the storage medium and stores the major classification discrimination function as a discrimination dictionary in the storage medium.

In the pattern recognition, in order to speed up the recognition processing, rough recognition processing for narrowing correct solution candidate categories is executed using the major classification discrimination function which is able to calculate at a high speed. Thereafter, the similarity of an input pattern for each of the correct solution candidate categories is calculated using the detail discrimination function to produce a final recognition result as the correct solution candidate category. A pattern recognition apparatus comprises the discrimination function major part extraction unit for outputting, in a learning phase, a major classification feature conversion function and the major classification discrimination function as the feature selection dictionary and the discrimination dictionary, respectively

CITATION LIST

Patent Literatures

PL 1: JP 2017-037392 A
PL 2: JP 2014-178229 A
PL 3: JP 2011-008634 A

SUMMARY OF INVENTION

Technical Problem

Upon learning the deep network, a large amount of training data are generally required and it is difficult to learn using a small number of pieces of training data. This is because, in the deep network, parameters to be learned are very large in number and generalization performance significantly decreases due to overfitting in a case where the number of pieces of the training data is small. A method best adopted in order to resolve this problem is a method of artificially increasing the number of pieces of data by processing the training data.

The method of artificially increasing the number of pieces of data by processing the training data broadly includes two kinds of methods. One method is a "data augmentation method" while another method is an "adversarial pattern generation method."

The data augmentation method is a technique of generating data by adding perturbations (e.g. translation movement, rotation, scaling, and so on) to the training data. Generation by the data augmentation method can generate data which can be actually supplied to the neural network. On the other hand, however, the generation by the data augmentation method is disadvantageous in that it is not efficient because data contributing to an improvement of learning of the neural network are not always generated.

The adversarial pattern generation method is a method of adding, to the training data, artificial minute noises so that recognition by a machine is difficult. However, the adversarial pattern generation method may generate noisy data which cannot actually exist because it does not consider whether or not the generated data follow a distribution of the training data. As a result, in the adversarial pattern generation method, it is difficult to efficiently generate data which contribute to an improvement of the learning of the neural network.

On the other hand, each of the above-mentioned Patent Literatures 1-3 has problems which will be described in the following.

Patent Literature 1 merely discloses a technique of optimizing the structure of the neural network by newly generating the additional intermediate layer as another intermediate layer and so on. That is, Patent Literature 1 neither discloses nor suggests a method of increasing the training data.

Patent Literature 2 discloses a technical idea that supplementation of the teaching data is carried out for a classification category having a less number of teaching images as a target category in order to effectively avoid disadvantageous overfitting or the like caused by imbalance of the number of pieces of the teaching data. That is, Patent Literature 2 generates new teaching data by adding a predetermined value to a value of at least one of various kinds of features representing the teaching data in a manner similar to the above-mentioned data augmentation method. As a result, like the above-mentioned data augmentation method, the technical idea disclosed in Patent Literature 2 is disadvantageous in that it does not always generate data contributing to an improvement of the learning of the neural network and is not efficient.

Patent Literature 3 merely discloses a technical idea that the discrimination function major part extraction unit generates, in the learning phase, the major classification feature conversion function for converting the m-dimensional feature into the L-dimensional feature and the major classification discrimination function for calculating the similarity of the pattern as the recognition target for each category on the L-dimensional feature space. Moreover, Patent Literature 3 does not learn the neural network and neither discloses nor suggests the method of processing the training data.

OBJECT OF INVENTION

It is an object of this invention to learn a neural network with high performance by processing, when the number of pieces of training data is small, the training data to efficiently generate data which contribute to an improvement of learning and by learning those data.

Solution to Problem

A neural network learning device according to the present invention comprises: a feature extraction unit configured to extract features from training data using a neural network being currently learned; an adversarial feature generation unit configured to generate an adversarial feature from the extracted features using the neural network being currently learned; a pattern recognition unit configured to calculate a recognized result of the neural network using the training data and the adversarial feature; and a network learning unit configured to learn the neural network so that the recognized result approaches a desired output.

Advantageous Effect of Invention

An advantageous effect of this invention is that a neural network with high performance can be learned by processing training data to efficiently generate data which contribute to an improvement of learning and by learning those data.

DESCRIPTION OF EMBODIMENTS

[Explanation of Configuration]

Figure 1:
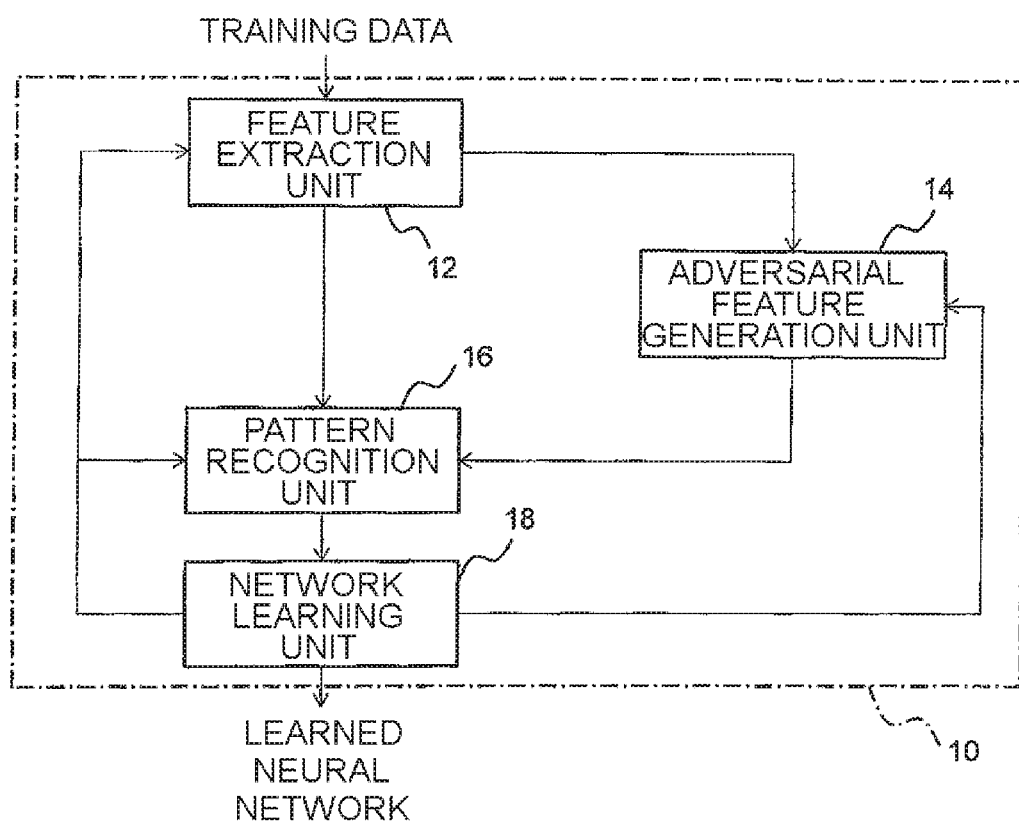
FIG. 1 is a block diagram for illustrating a configuration of a neural network learning device according to an example embodiment of the present invention.

FIG. 1 is a block diagram for illustrating a configuration of a neural network learning device 10 according to an example embodiment of the present invention. The illustrated neural network learning device 10 includes a feature extraction unit 12, an adversarial feature generation unit 14, a pattern recognition unit 16, and a network learning unit 18.

The feature extraction unit 12 extracts features from training data using a neural network being currently learned.

The adversarial feature generation unit 14 generates, using the neural network being currently learned, an adversarial feature from the features extracted by the feature extraction unit 12. The pattern recognition unit 16 calculates an output recognized result of the neural network using the training data and the adversarial feature. The network learning unit 18 learns the neural network so that the recognized result approaches a desired output. Herein, a combination of the training data and the adversarial feature corresponds to data which are generated by processing the training data.

[Explanation of Operation]

Figure 2:
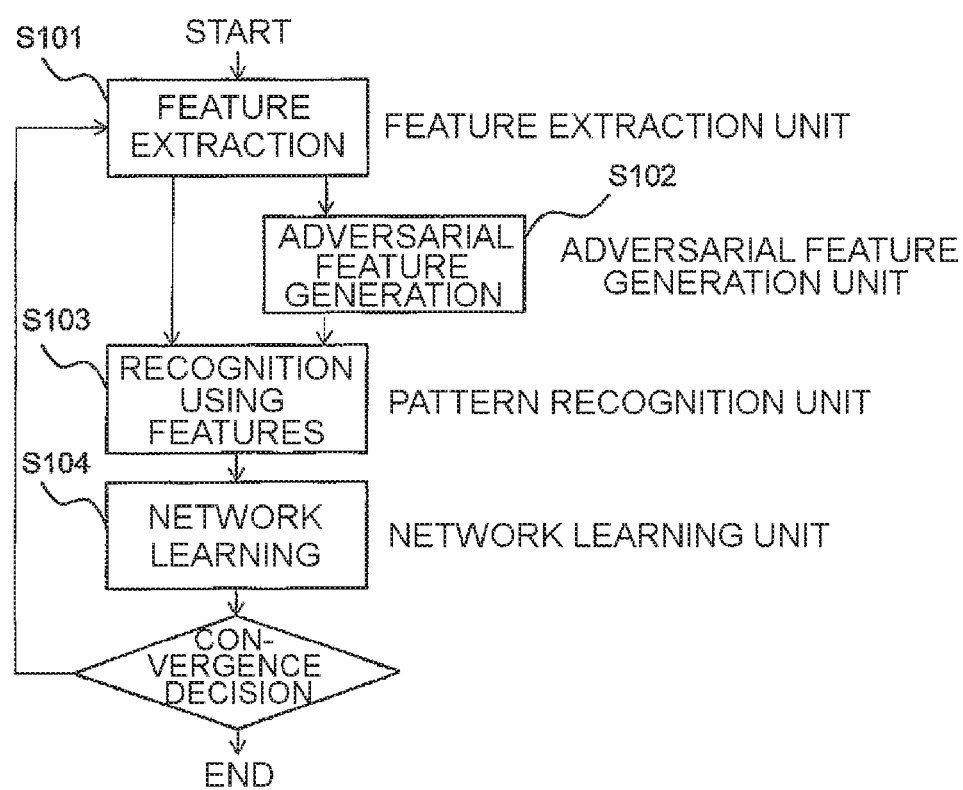
FIG. 2 is a flow chart for use in describing an operation of the neural network learning device illustrated in FIG. 1.

Referring to FIGS. 1 and 2, description will proceed to an operation of this example embodiment in detail. FIG. 2 is a flow chart for use in describing an operation of the neural network learning device 10 illustrated in FIG. 1.

The feature extraction unit 12 extracts features from input training data using a neural network being currently learned (step S101). The adversarial feature generation unit 14 adds, to the features extracted by the feature extraction unit 12, perturbations so that recognition by the neural network being currently learned becomes difficult, and generates an adversarial feature (step S102). The pattern recognition unit 16 calculates, for each of the features extracted by the feature extraction unit 12 and the adversarial feature generated by the adversarial feature generation unit 14, a recognized result using the neural network being currently learned and outputs the recognized result (step S103). The network learning unit 18 renews the neural network so that the recognized result produced by the pattern recognition unit 16 becomes a desired recognized result, and learns the neural network (step S104).

An advantageous effect of this example embodiment will be described. The advantageous effect of this example embodiment is that a neural network with high performance can be learned by processing training data with an adversarial feature generated on a feature space to efficiently generate data which contribute to an improvement of learning, and by learning the neural network using the data thus generated.

The reason is as follows. The feature space is a space which well represents a distribution of the training data. Therefore, it is considered that a neighborhood of a pattern existing on the feature space is a set of patterns whose meanings are similar to that of the pattern in question. Accordingly, by generating the adversarial feature on the feature space, it is possible to generate, among patterns whose meanings are similar, a pattern which is most difficult to recognize and it is possible to efficiently generate the data which contribute to an improvement of the learning of the neural network.

Figure 7:
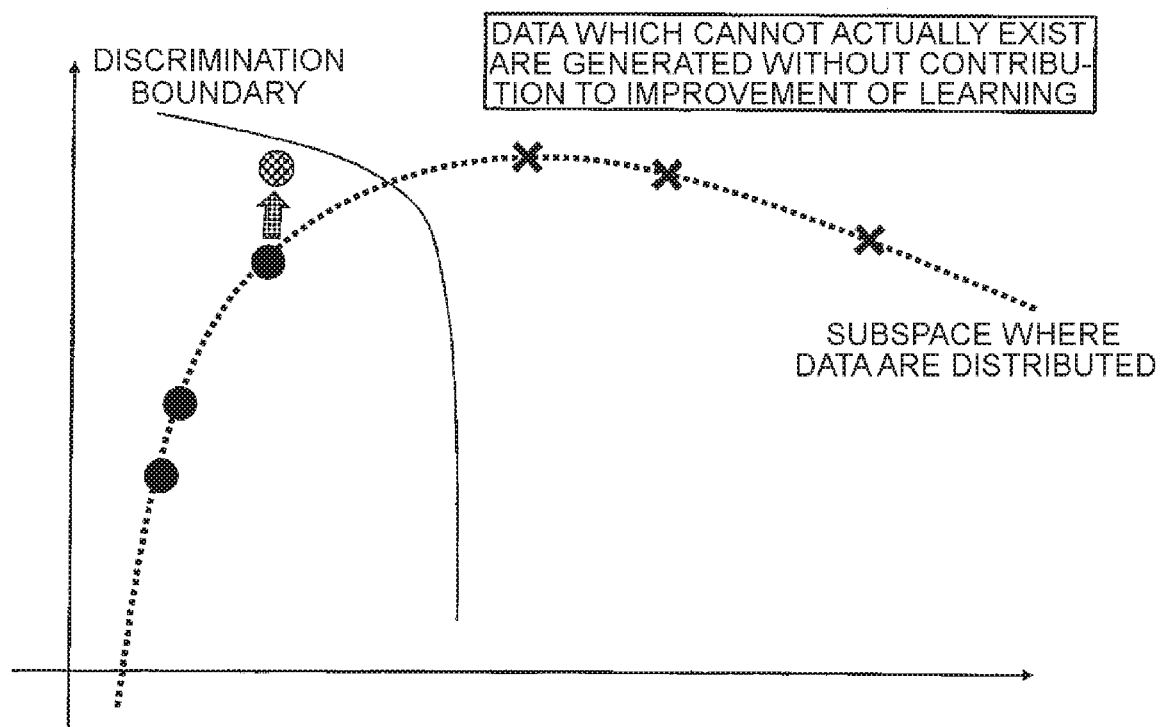
FIG. 7 is a graph for use in describing data (data which cannot exist actually) which are generated by an adversarial pattern generation method in a related art.
Figure 8:
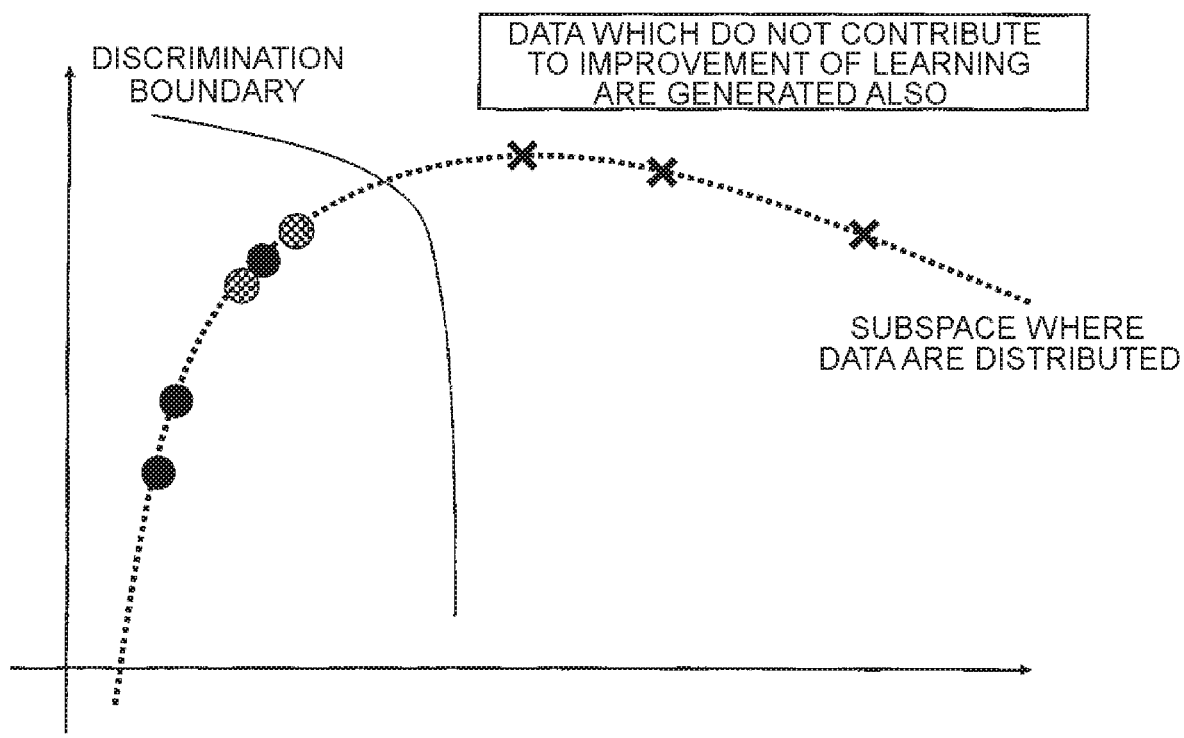
FIG. 8 is a graph for use in describing data (data which do not contribute to an improvement of learning) which are generated by a data augmentation method in a related art.

Using FIGS. 6 to 8, the advantageous effect of this example embodiment as compared with the methods of the related art will be described in detail based on a specific example. This example illustrates a case of discriminating two classes of • and x for a two-dimensional input pattern. Furthermore, it is assumed that data actually exist only on a one-dimensional subspace depicted at a dotted line although the data are two-dimensionally represented. Such a condition that training data are distributed only in the subspace of the feature space may generally occur in a field of pattern recognition.

In a case of generating data using the data augmentation method of the related art, data are generated by preliminarily designating perturbations which may possibly occur in the data. For this reason, the data augmentation method can generate data following the distribution (the dotted line in the figure) of the training data as shown in FIG. 8. However, the data augmentation method does not consider whether or not the data contribute to an improvement of the learning of the neural network. As a result, the data augmentation method is disadvantageous in that it is difficult to efficiently improve the performance of the learning of the neural network.

On the other hand, the adversarial pattern generation method of the related art generates data so that discrimination becomes difficult. For this reason, the adversarial pattern generation method can generate data which are close to a discrimination boundary as shown in FIG. 7. However, the adversarial data generation method does not consider whether or not generated data follow the distribution of the training data. As a result, the adversarial data generation method may generate data which cannot actually exist (data other than those on the dotted line) and the data thus generated do not always contribute to an improvement of the learning of the neural network.

Figure 6:
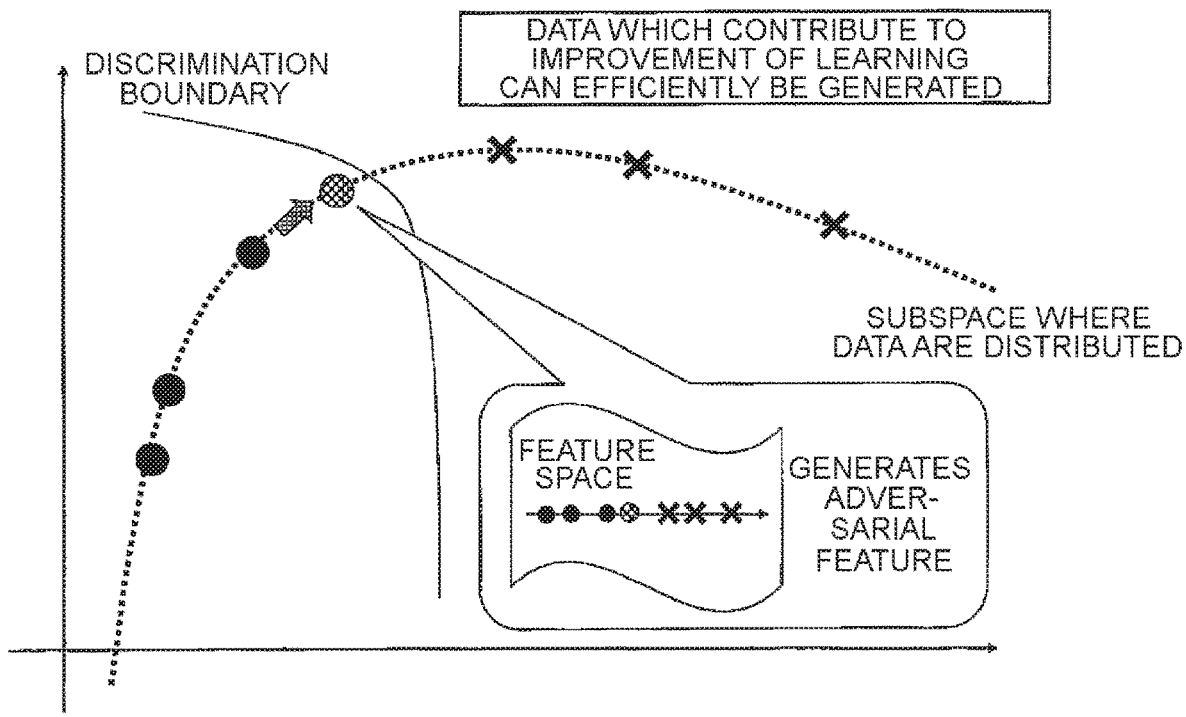
FIG. 6 is a graph for use in describing data (data which contribute to an improvement of learning) which are generated using the neural network learning device illustrated in FIG. 1.

On the other hand, this example embodiment generates the adversarial feature on the one-dimensional feature space which well represents the distribution of the training data, as shown in FIG. 6. For this reason, this example embodiment can process the training data so as to generate the data which follow the distribution of the training data and which are close to the discrimination boundary. As a result, it is possible to efficiently improve the performance of the neural network by learning the neural network using data which are obtained by the above-mentioned processing.

In order to further facilitate understanding of this invention, description will proceed to differences between this example embodiment and the inventions described in the above-mentioned Patent Literatures 1-3.

The invention disclosed in Patent Literature 1 optimizes the structure of the neural network by modifying the structure of the neural network. In comparison with this, this example embodiment processes the training data to be supplied to the neural network without modifying the structure of the neural network and learns the neural network using the data generated by the processing.

In the invention disclosed in Patent Literature 2, a special-purpose feature calculation unit calculates a value of a feature without using a learning algorithm for a neural network in a defect classification unit or the like. In comparison with this, in this example embodiment, the feature extraction unit 12 extracts the features from the training data using the neural network being currently learned. The invention disclosed in Patent Literature 2 generates (supplements), in the pre-training, the new teaching data in the vicinity of the teaching data in a case where the number of pieces of the teaching data is insufficient In comparison with this, this example embodiment efficiently generates data which contribute to an improvement of the learning of the neural network by processing the training data supplied to the neural network without generating (supplementing) the new teaching data (training data).

Although, in the invention disclosed in Patent Literature 3, the feature extraction unit extracts the n-dimensional feature, no description is made about which algorithm is specifically used for the purpose of extraction. In comparison with this, in this example embodiment, the feature extraction unit extracts the features from the training data using the neural network being currently learned. The invention disclosed in Patent Literature 3 generates the pattern recognition dictionary from a plurality of learning patterns. In comparison with this, this example embodiment uses and processes the training data and learns the neural network using the data generated by the processing without generating the pattern recognition dictionary.

As described above, this example embodiment is quite different in problem to be solved, configuration, and function and effect from the inventions described in Patent Literatures 1-3.

Example 1

Figure 3:
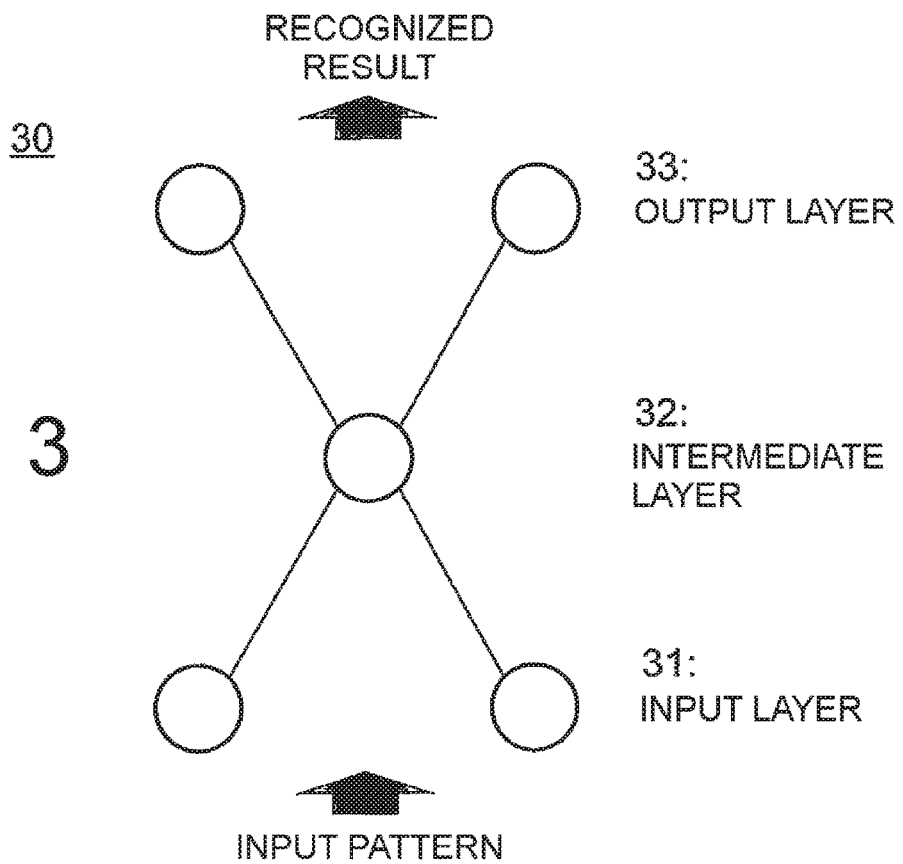
FIG. 3 is a diagram for illustrating an example of a neural network.

New, description will proceed to an operation of a mode for embodying this invention using a specific first example. This first example illustrates an example of learning a neural network 30 shown in FIG. 3.

The neural network 30 includes an input layer 31, an intermediate layer 32, and an output layer 33. The input layer 31 is supplied with a two-dimensional learning pattern. The neural network 30 produces, from the output layer 33 through the intermediate layer 32 having one hidden unit, a probability per each class as discriminated results of two classes. In this example, it is assumed that all of the layers 31 to 33 are fully connected to one another and an activating function is an identity function.

Figure 4:
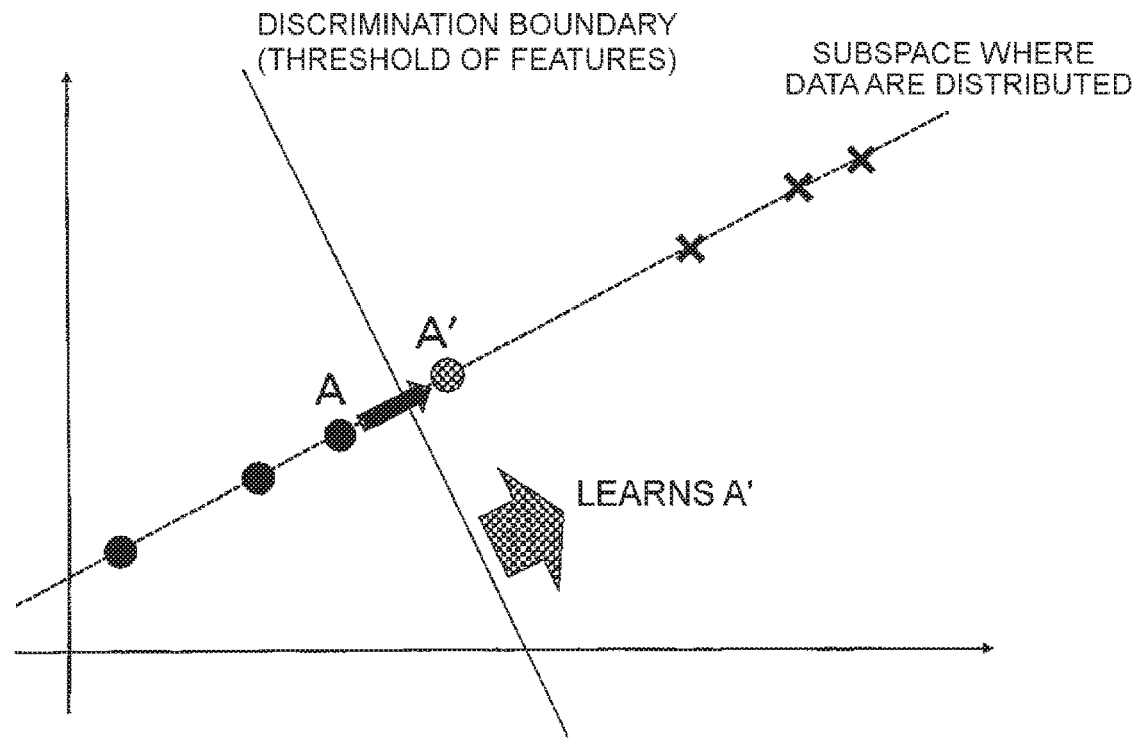
FIG. 4 is a graph for illustrating an example for extracting features from training data.

The feature extraction unit 12 extracts the features from the training data using the neural network 30. In a case of using the neural network 30 in FIG. 3, the feature extraction unit 12 extracts a one-dimensional feature depicted at a dotted line from the two-dimensional input pattern, as shown in FIG. 4.

The adversarial feature generation unit 14 generates the adversarial feature using the features extracted by the feature extraction unit 12 and the neural network being currently learned. Inasmuch as the neural network 30 of FIG. 3 carries out discrimination by threshold processing using the one-dimensional feature extracted by the intermediate layer 32, the adversarial feature generation unit 14 generates the adversarial feature by adding perturbations so that the feature comes close to the threshold. For example, for a feature A in FIG. 4, the adversarial feature generation unit 14 generates the adversarial feature A' so that an output of a unit in the output layer 33 that produces a probability of belonging to the class • becomes small and an output of a unit that produces a probability of belonging to the class x becomes large.

The pattern recognition unit 16 calculates the recognized result using the neural network 30 being currently learned for each of the features extracted by the feature extraction unit 12 and the adversarial feature generated by the adversarial feature generation unit 14. In the example in FIG. 4, the pattern recognition unit 16 correctly discriminates the feature A as the class • but discriminates the adversarial feature A' as the class x.

The network learning unit 18 renews the neural network 30 so that the recognized result produced by the pattern recognition unit 16 becomes the desired recognized result, and learns the neural network. In the example in FIG. 4, the network learning unit 18 learns in the manner such that the discrimination boundary (the threshold of the features) is shifted rightward so as to discriminate the adversarial feature A' as the class •.

As described above, in the first example, the discrimination boundary can be kept very far away from samples by generating the adversarial feature within the subspace where the training data exist and by learning the neural network. As a result, it is possible to learn the neural network with a large margin and high generalization performance.

Example 2

Figure 5:
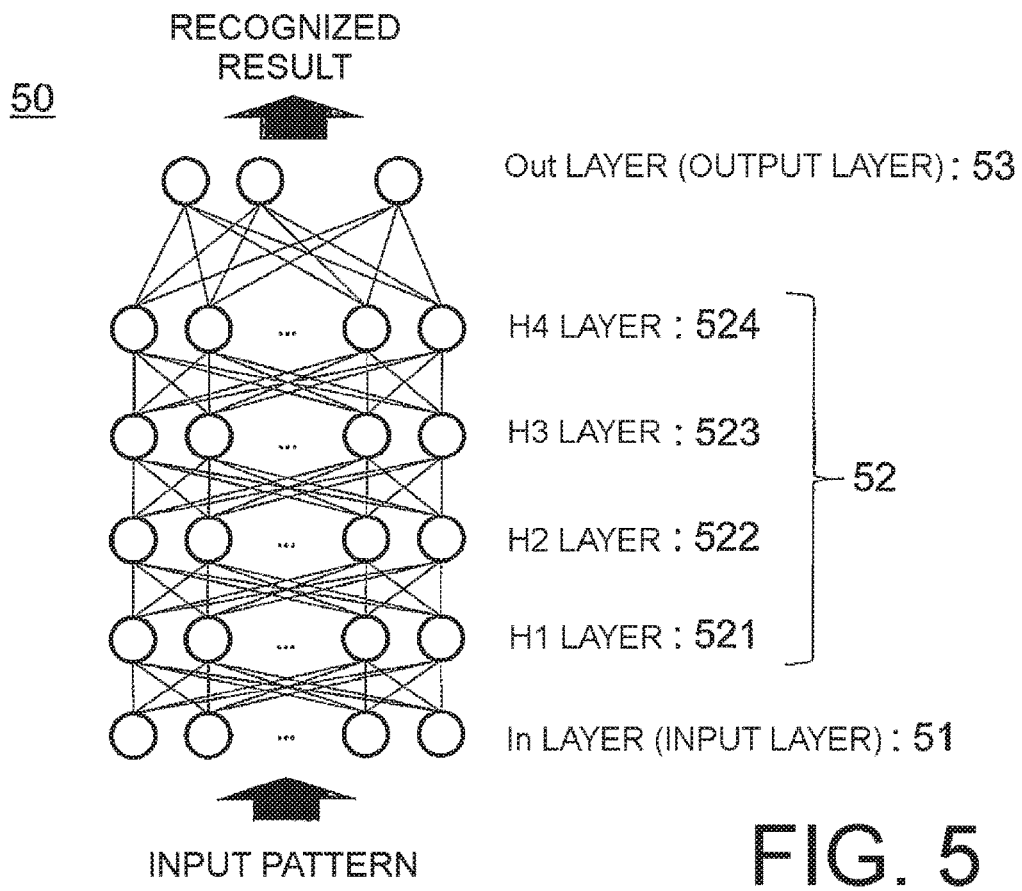
FIG. 5 is a diagram for illustrating an example of a neural network to be learned.

Now, description will proceed to an operation of a mode for embodying this invention as regards a second example in a case where the intermediate layer is a multilayer. This second example illustrates an example of learning a neural network 50 shown in FIG. 5.

The neural network 50 includes an input layer 51, an intermediate layer 52, and an output layer 53. In such a neural network 50, the input layer 51 is supplied with a learning pattern and the output layer 53 produces a recognized result. The intermediate layer 52 includes four layers: an H1 layer 521, an H2 layer 522, an H3 layer 523, and an H4 layer 524.

The feature extraction unit 12 extracts the features from the training data using the neural network 50 being currently learned. In a case of using the neural network 50 in FIG. 5, for example, the feature extraction unit 12 randomly selects one layer from the intermediate layer 52 and produces a value of the intermediate layer 52 as the feature. Herein, it is assumed that the feature extraction unit 12 produces a value of the H3 layer 523 as the feature.

When an input pattern is represented by x and a parameter in the network being currently learned is represented by θ, the extracted feature z is written as follows.

$$z = f(x|\theta, In, H3) \qquad \text{[Math. 1]}$$

Herein, f(x|θ,A,B) represents an operation of calculating a value of a B layer when a value of an A layer is given by x in the network having the parameter θ. Selection of the intermediate layer 52 to produce the feature may be carried out randomly or may be determined in a deterministic fashion in accordance with a method preliminarily determined.

The adversarial feature generation unit 14 generates the adversarial feature using the features extracted by the feature extraction unit 12 and the neural network 50 being currently learned. As a method of generating the adversarial feature, a method similar to the adversarial pattern generation method of the related art may be used. For example, in a case of using Virtual Adversarial Training (VAT), the adversarial feature z' for z is generated as follows.

$$z' = z + r^* \qquad \text{[Math. 2]}$$
$$r^* = \underset{r}{\operatorname{argmax}} KL(f(z|\theta, H3, \text{Out}), f(z+r|\theta, H3, \text{Out}))$$
$$\text{subject to } \|r\| < \varepsilon$$

Herein, each of f(z|θ,H3,Out) and f(z+r|θ,H3,Out) represents an output of the output layer and therefore becomes a probability distribution of the class to which the input pattern belongs. KL (p,q) represents a function for calculating a KL divergence between two discrete probability distributions p and q.

$$KL(p, q) = \sum_i p(i) \log \frac{p(i)}{q(i)} \qquad \text{[Math. 3]}$$

Herein, i represents an index of the probability distribution and, in the second example, represents the index of a unit of the output layer 53.

In the second example, the adversarial feature generation unit 14 generates the adversarial feature by adding, to z, a perturbation providing a greatest change in the value of the output layer 53 among perturbations each having a magnitude which is equal to or less than ε.

The pattern recognition unit 16 calculates, for each of the features extracted by the feature extraction unit 12 and the adversarial feature generated by the adversarial feature generation unit 14, the recognized result using the neural network 50 being currently learned. In the second example, the pattern recognition unit 16 calculates values of the output layer 53 for z and z', respectively.

$$y = f(z|\theta, H3, \text{Out})$$
$$y' = f(z'|\theta, H3, \text{Out}) \qquad \text{[Math. 4]}$$

Herein, y represents the recognized result for original training data and y' represents the recognized result for the adversarial feature.

The network learning unit 18 renews the neural network 50 so that the recognized result produced by the pattern recognition unit 16 becomes the desired recognized result and learns the neural network. As a method of renewing the network, a gradient method based on a commonly-used backpropagation method or the like may be used. For example, when a most simple steepest descent method is used, a parameter in the neural network is renewed as follows.

$$\theta \leftarrow \theta - \mu \frac{\partial}{\partial \theta}(KL(y, t) + KL(y', t)) \qquad \text{[Math. 5]}$$

Herein, t represents the teaching signal indicative of the desired recognized result and μ represents a learning rate.

As mentioned above, in the second example also, the discrimination boundary can be kept very far away from the samples by learning the neural network with the adversarial feature generated within the subspace where the training data exist. As a result, it is possible to learn the neural network with the large margin and the high generalization performance.

Example 3

New, description will proceed to a third example. In order to make the adversarial feature further follow the distribution of the training data, restriction may be introduced on the adversarial feature or the perturbation for generating the adversarial feature.

In the first example mentioned above, the restriction on the perturbation r* for generating the adversarial feature is only a constraint that a magnitude is equal to or less than ε. In comparison with this, the third example introduces a constraint, for example, that it can be expressed by a linear combination of the training data. When a coefficient of the linear combination is given by c, the perturbation r is written as follows.

$$r = cZ = \sum_{i=1}^{M} c_i z_i \qquad \text{[Math. 6]}$$

Herein, Z represents a matrix of features $(z\_1, \ldots, z\_M)$ which are extracted from the training data. In this event, the adversarial feature z' can be generated as follows.

$$z' = z + r^*$$
$$r^* = c^* Z$$
$$c^* = \underset{c}{\operatorname{argmax}} KL(f(z \mid \theta, H3, \text{Out}), f(z + cZ \mid \theta, H3, \text{Out}))$$
$$\text{subject to } \|cZ\| < \varepsilon$$

[Math. 7]

As described above, in the third example also, the discrimination boundary can be kept very far away from the samples by learning the neural network with the adversarial feature generated within the subspace where the training data exist. As a result, it is possible to learn the neural network with the large margin and the high generalization performance.

It is possible to achieve a pattern recognition apparatus by using the neural network obtained by learning as described above. That is, the pattern recognition apparatus carries out pattern recognition on the basis of the neural network 30 or 50 which is learned using the above-mentioned neural network learning device 10.

Respective parts (respective components) of the neural network learning device 10 may be implemented by using a combination of hardware and software. In a form in which the hardware and the software are combined, the respective parts (the respective components) are implemented as various kinds of means by developing a neural network leaning program in an RAM (random access memory) and making hardware such as a control unit (CPU (central processing unit)) and so on operate based on the program. The program may be recorded in a recording medium to be distributed. The program recorded in the recording medium is read into a memory via a wire, wirelessly, or via the recording medium itself to operate the control unit and so on. By way of example, the recording medium may be an optical disc, a magnetic disk, a semiconductor memory device, a hard disk, or the like.

Explaining the above-mentioned example embodiment (examples) with different expression, it is possible to implement the embodiment by making a computer to be operated as the neural network learning device 10 act as the feature extraction unit 12, the adversarial feature generation unit 14, the pattern recognition unit 16, and the network learning unit 18 according to the neural network learning program developed in the RAM.

As described above, according to the example embodiment (examples) of the present invention, it is possible to effectively learn the neural network even with a small number of pieces of training data.

This invention is not strictly limited to the specific configurations of the above-mentioned example embodiment, and this invention involves any changes in a range not departing from the gist of this invention.

While the present invention has been described with reference to the example embodiment and the examples thereof, the present invention is not limited to the foregoing example embodiment and examples. The configuration and the details of this invention may be modified within the scope of this invention in various manners which could be understood by those of ordinary skill.

Industrial Applicability

This invention is applicable to, in image processing or speech processing, uses for discriminating a pattern, for example, face recognition, object recognition, and so on.

Reference Signs List
 10 neural network learning device
 12 feature extraction unit
 14 adversarial feature generation unit
 16 pattern recognition unit
 18 network learning unit
 30 neural network
 31 input layer
 32 intermediate layer
 33 output layer
 50 neural network
 51 input layer
 52 intermediate layer
 521 H1 layer
 522 H2 layer
 523 H3 layer
 524 H4 layer
 53 output layer

What is claimed is:

1. A neural network learning device, comprising:
a processor; and
a memory storing executable instructions that, when executed by the processor, causes the processor to perform as:
a feature extraction unit configured to extract features from training data using a neural network being currently learned;
an adversarial feature generation unit configured to generate an adversarial feature by adding, to the extracted features, perturbations so that recognition by the neural network being currently learned becomes difficult;
a pattern recognition unit configured to calculate a recognized result of the neural network using the extracted features and the adversarial feature; and
a network learning unit configured to learn the neural network so that the recognized result approaches a desired output.

2. The neural network learning device as claimed in claim 1, wherein the adversarial feature generation unit is configured to generate the adversarial feature under a constraint which is represented by a linear combination of the training data.

3. A pattern recognition apparatus configured to perform pattern recognition based on a neural network which is learned by using the neural network learning device claimed in claim 1.

4. A neural network learning method comprising:
extracting features from training data using a neural network being currently learned;
generating an adversarial feature by adding, to the extracted features, perturbations so that recognition by the neural network being currently learned becomes difficult;
calculating a recognized result of the neural network using the extracted features and the adversarial feature; and
learning the neural network so that the recognized result approaches a desired output.

5. The neural network learning method as claimed in claim 4, wherein the generating generates the adversarial feature under a constraint which is represented by a linear combination of the training data.

6. A non-transitory computer readable recording medium for storing a neural network learning program for causing a computer to execute:
a process for extracting features from training data using a neural network being currently learned;

a process for generating an adversarial feature by adding, to the extracted features, perturbations so that recognition by the neural network being currently learned becomes difficult;

a process for calculating a recognized result of the neural network using the extracted features and the adversarial feature; and a process for learning the neural network so that the recognized result approaches a desired output.

7. The non-transitory computer readable recording medium as claimed in claim 6, wherein the process for generating causes the computer to generate the adversarial feature under a constraint which is represented by a linear combination of the training data.

* * * * *